J. M. Henrie.
Rat Trap.

No. 93,714. Patented Aug. 17, 1869.

Witnesses
O. Hinchman
Jno. F. Brooks

Inventor
J. M. Henrie
per Munn & Co.
Attys.

United States Patent Office.

J. M. HENRIE, OF VANDALIA, IOWA.

Letters Patent No. 93,714, dated August 17, 1869.

IMPROVEMENT IN RAT-TRAP.

The Schedule referred to in these Letters Patent and making part of the same.

*To all to whom it may concern:*

Be it known that I, J. M. HENRIE, of Vandalia, in the county of Jasper, and State of Iowa, have invented a new and improved Rat-Trap; and I do hereby declare that the following is a full, clear, and exact description thereof, which will enable others skilled in the art to make and use the same, reference being had to the accompanying drawing, forming part of this specification.

The object of this invention is to provide an improved self-setting trap, for catching rats and other animals.

It consists of a box, preferably having two chambers or spaces, one being permanently covered and the other provided with a sliding cover, which is connected by rods to a crank-shaft, to which a weighted cord is attached for rotating it.

Each revolution of the crank-shaft will withdraw and return the cover, and at each return it is locked and held until the animal, getting on the cover for the bait, by his weight depresses a hinged part and unlocks it, permitting the weight to draw it back suddenly under a plate, which scrapes the animal off into the pit below, where he is secured by the return of the cover.

The invention also comprises a locking-device for holding it closed when run down, an arrangement of springs for quickly setting the cover into motion, and arresting the motion of the said door at the close of the return movement.

Similar letters of reference indicate corresponding parts.

Figure 1:
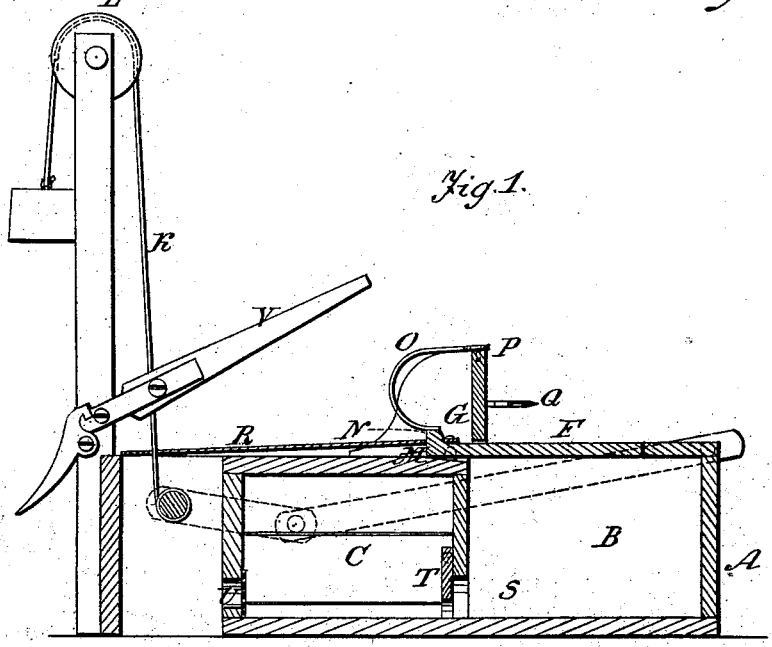
Figure 1 represents a sectional elevation of my improved trap.
Figure 2:
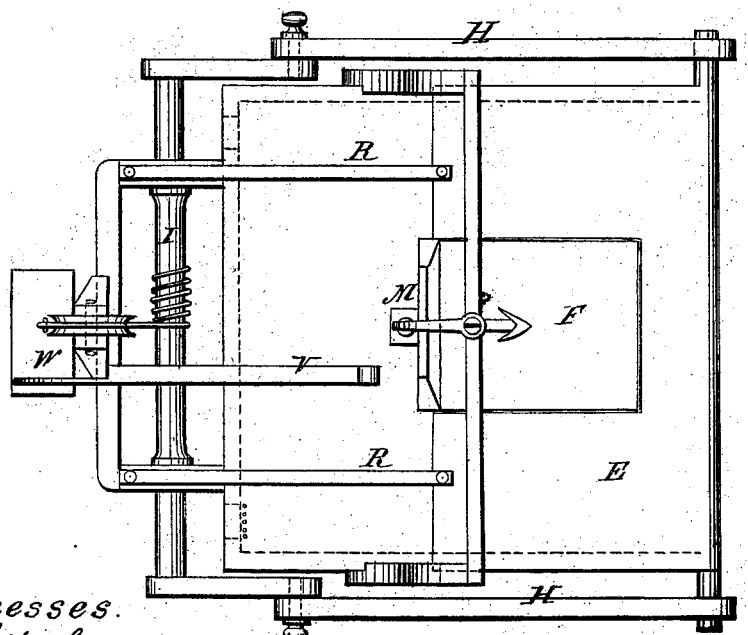
Figure 2 represents a plan view of the same.

A represents a strong rectangular box, divided into two chamber B and C, by the partition D.

The chamber C is provided with a permanent cover, and the chamber B has a cover, E, capable of sliding back and forth over the cover of the part C.

This cover is provided with a movable part, F, hinged or pivoted to it at G, and is connected by rods H to the cranks of a shaft, I, capable of rotation, and having a weighted cord, K, wound around it and carried over an elevated pulley, L.

The hinged part F of the cover, when the latter is in the closed position represented in the drawings, drops behind a locking-bolt, M, and a projection, N, thereon, passes under a spring, O, which presses the edge of the said part F down, to insure the locking and to raise the opposite edge.

P represents a plate or board, in an edgewise position above the trap, and under which the cover slides.

It supports the spring o, and a bait-hook, Q.

R represents elastic cords or springs, which are under tension when the trap is closed.

When a rat in pursuit of the bait passes on to the part F of the cover, his weight will press it down, so as to disengage it from the block M, and thus allow the weight, by the rotation of the shaft, to suddenly draw the cover under the board P, which scrapes the animal off into the chamber B.

The continued rotation of the shaft will return the cover, and the springs O will press the part F down behind the block, resetting the trap.

When the trap is sprung, the springs R, being under tension, will assist to suddenly set the cover into motion, and the return movement of the cover will, by imparting tension to the said springs, be deprived, to a considerable extent, of its power to cause a shock and noise.

To induce the rats to pass from the chamber B, to prevent any chance of escaping by the cover when opened, I provide passages S, having doors T opening into the space C, and I make holes V, suitably protected to admit light, toward which the rats will naturally go in their efforts to escape, provision being made for the light to be seen through small holes in the doors T.

V represents a locking-lever, supported in an elevated position by a dog, W, and arranged to be disconnected by the weight previously to running down, so as to fall behind the cover, and permanently lock it, to prevent the escape of the animals when the force of the weight on the cover is lost.

Having thus described my invention,

What I claim as new, and desire to secure by Letters Patent, is—

1. The combination of the hinged part F with the cover E, stop M, and spring O, substantially as specified.

2. The combination with the cover and weighted cord, of the locking-bar V, and dog W, substantially as specified.

3. The improved trap, above described, all its parts being constructed and arranged, with reference to each other, as shown and set forth.

J. M. HENRIE.

Witnesses:
   D. G. BROWN,
   WILLIAM H. DRAPER.